(12) United States Patent
Williams

(10) Patent No.: US 11,776,429 B2
(45) Date of Patent: Oct. 3, 2023

(54) WEARABLE AIRWAY MEDICAL TRAINING DEVICE

(71) Applicant: Rhys Joseph Williams, Palmyra, VA (US)

(72) Inventor: Rhys Joseph Williams, Palmyra, VA (US)

(*) Notice: Subject to any disclaimer, the term of this patent is extended or adjusted under 35 U.S.C. 154(b) by 601 days.

(21) Appl. No.: 16/947,125

(22) Filed: Jul. 20, 2020

(65) Prior Publication Data

US 2021/0020070 A1 Jan. 21, 2021

Related U.S. Application Data

(60) Provisional application No. 62/876,490, filed on Jul. 19, 2019.

(51) Int. Cl.
*G09B 23/30* (2006.01)
*G09B 23/34* (2006.01)

(52) U.S. Cl.
CPC .......... *G09B 23/303* (2013.01); *G09B 23/34* (2013.01)

(58) Field of Classification Search
CPC ....... G09B 23/28; G09B 23/30; G09B 23/303
See application file for complete search history.

(56) References Cited

U.S. PATENT DOCUMENTS

| | | | | |
|---|---|---|---|---|
| 5,839,904 A * | 11/1998 | Bloom | ................ | G09B 23/285 434/272 |
| 7,306,465 B2 * | 12/2007 | White | ................ | G09B 23/285 434/268 |
| 8,221,129 B2 * | 7/2012 | Parry | ..................... | G09B 9/003 434/274 |
| 8,408,920 B2 * | 4/2013 | Speller | ................ | G09B 23/285 434/267 |
| 8,840,403 B2 * | 9/2014 | Segall | .................... | G09B 23/32 434/272 |
| 8,944,825 B2 * | 2/2015 | Reid-Searl | ............. | G09B 23/30 434/267 |
| 9,679,501 B2 * | 6/2017 | Sakezles | ................ | G09B 23/34 |
| 10,726,743 B2 * | 7/2020 | Segall | ................. | G09B 23/303 |
| 2014/0154656 A1 * | 6/2014 | Segall | .................... | G09B 23/30 434/265 |
| 2018/0158373 A1 * | 6/2018 | Hendrickson | .......... | G09B 23/36 |

* cited by examiner

*Primary Examiner* — Kurt Fernstrom
(74) *Attorney, Agent, or Firm* — Dunlap Bennett & Ludwig, PLLC

(57) ABSTRACT

An airway-related medical training system composed of a base plate and a front panel. The base plate is secured around the neck of a role-playing wearer and has an integrated cut-resistant layer. The front panel connects over the base plate of the wearer. The front panel provides a trachea portion having a replaceable cuttable skin portion to facilitate the airway-related medical training. The front portion may also provide a fluidly coupled blood simulator, a simulated wound site, and other indicia of neck injuries that are used to teach and educate trainees of the airway-related medical training system.

12 Claims, 5 Drawing Sheets

WEARABLE AIRWAY MEDICAL TRAINING DEVICE

CROSS-REFERENCE TO RELATED APPLICATION

This application claims the benefit of priority of U.S. provisional application No. 62/876,490, filed 19 Jul. 2019, the contents of which are herein incorporated by reference.

BACKGROUND OF THE INVENTION

The present invention relates to medical training devices and, more particularly, a wearable airway medical training device.

When conducting airway-related medical training, emergency medical personnel face the challenge of learning their trade using unrealistic and bulky wearable surgical airway training devices. Simply put, current surgical airway training devices are too large, thereby creating an inaccurate appearance of the neck, resulting in an unrealistic experience, and thereby inculcating the medical personal being trained in surgical airway procedures with an impracticable simulation. Additionally, the reset time for current surgical airway training devices is not conducive to training a large number of students.

As can be seen, there is a need for a wearable medical training device that provides a realistic airway-related training simulation as well as capable of being quickly reset.

The device embodied in the present invention allows a role player to more accurately simulate a patient with an airway obstruction, and thereby more constructively teach related surgical airway procedures, while maintaining realism for the trainee and safety for the wearer. The present invention allows for safe and realistic surgical airway training through providing a wearable airway medical training device with the lowest possible profile, thereby facilitating a realistic simulation by the role player in movement and appearance. Additionally, the airway medical training devise embodied by the present invention enables rapid resetting of the device for a fast-paced training environment.

SUMMARY OF THE INVENTION

In one aspect of the present invention, a neck-related medical training system includes the following: a cut-resistant layer dimensioned and adapted to wrap around a portion of a neck of a wearer; and a front panel having an access window, the front panel configured to removably attached to the cut-resistant layer so that the access window is adjacent to a trachea of the wearer.

In another aspect of the present invention, the neck-related medical training system includes the following: a base plate having a cut-resistant layer, the base plate dimensioned and adapted to wrap around a neck of a wearer to form a secured condition; the base plate having a flap portion that is adjacent a lower portion of the neck in the secured condition; a front panel having an access window, the front panel configured to removably attached to the cut-resistant layer so that the access window is adjacent to a trachea of the wearer; a simulated skin removable engageable within the access window; and a blood reservoir fluidly coupled to the simulated skin.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, the present invention embodies a two-piece airway-related medical training system composed of a base plate and a front panel. The base plate is secured around the neck of a role-playing wearer and has an integrated cut-resistant layer. The front panel connects over the base plate of the wearer. The front panel provides a trachea portion having a replaceable cuttable skin portion to facilitate the airway-related medical training. The front portion may also provide a fluidly coupled blood simulator, a simulated wound site, and other indicia of neck injuries that are used to teach and educate trainees of the airway-related medical training system.

Referring now to FIGS. 1 through 7C, the present invention may include a base plate 1 and a front plate 6 adapted to work in concert to provide a wearable, safe, low-profile device for training airway-related surgical procedures. The base plate 1 and the front plate 6 may be $\frac{1}{16}$th to $\frac{3}{16}$th inch in thickness, or in other words the combined being the thickness of the base plate thickness and the front plate thickness, wherein the combined thickness is between and including $\frac{1}{8}$th of an inch to $\frac{3}{8}$th of an inch. The base plate 1 may encompass a flexible steel mesh 2 or have the flexible steel mesh 2 embedded therein or otherwise integrated thereto. The flexible steel mesh 2 may be replaced with any flexible, durable, cut-resistant layer, like Kevlar or a blend of Kevlar and steel or a composite of like materials.

Figure 1:
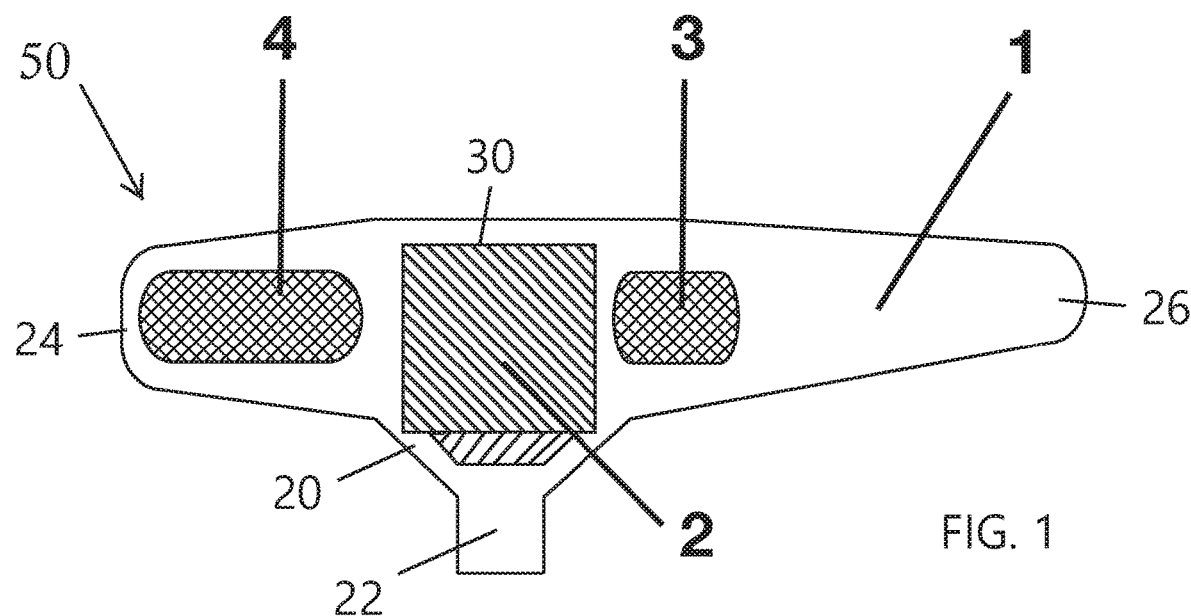
FIG. 1 is a front elevation view of an exemplary embodiment of a base plate of the present invention.
Figure 2:
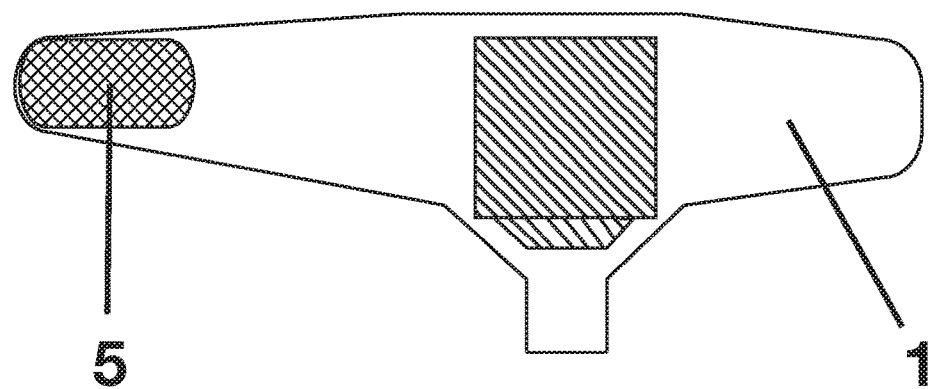
FIG. 2 is a rear elevation view of an exemplary embodiment of the base plate of the present invention.
Figure 3B:
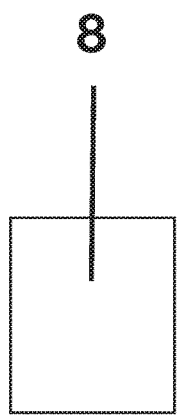
FIG. 3B is a schematic view of an exemplary embodiment of a first skin color and texture 8 of the present invention.
Figure 3A:
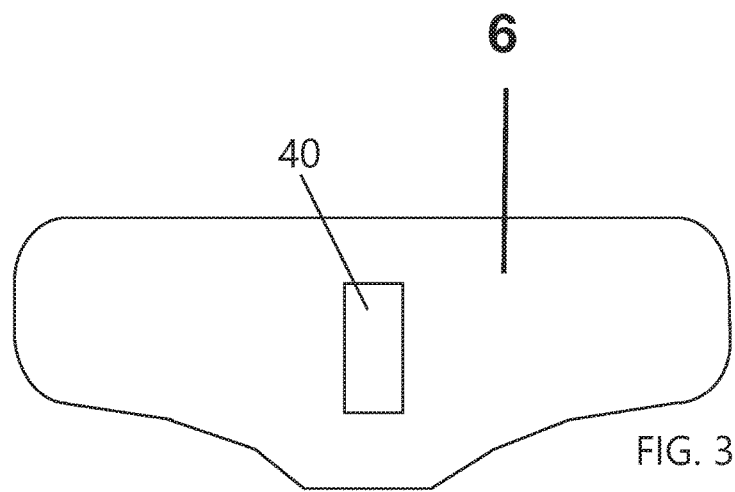
FIG. 3A is a front elevation view of an exemplary embodiment of a front panel of the present invention.
Figure 4B:
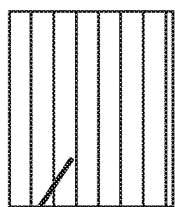
FIG. 4B is a schematic view of an exemplary embodiment of a second skin color and texture 9 of the present invention.
Figure 4A:
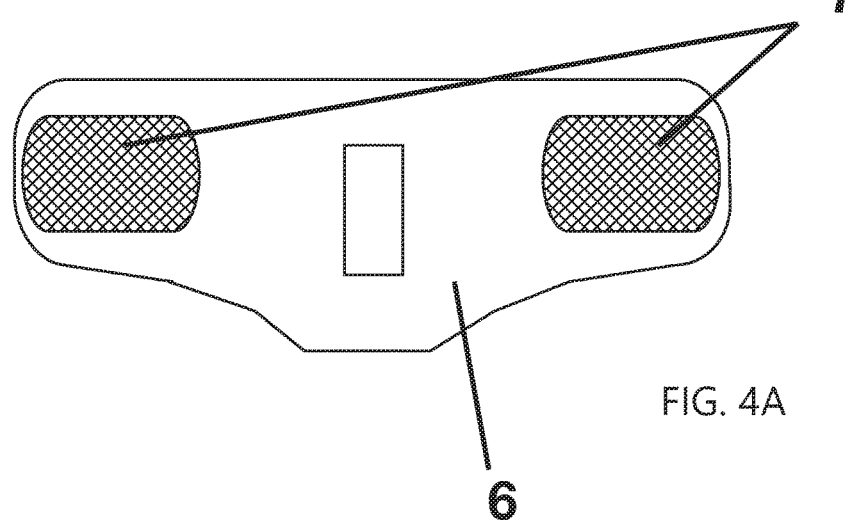
FIG. 4A is a rear elevation view of an exemplary embodiment of the front panel of the present invention.
Figure 5B:
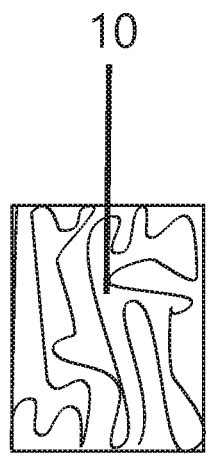
FIG. 5B is a schematic view of an exemplary embodiment of a third skin color and texture 10 of the present invention.
Figure 5A:
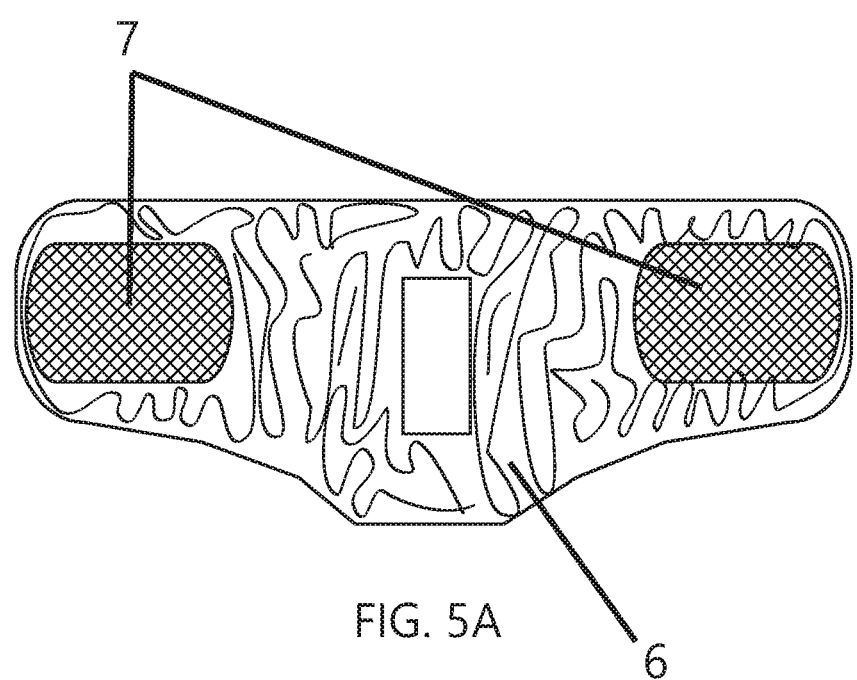
FIG. 5A is a rear elevation view of an exemplary embodiment of the front panel of the present invention.
Figure 6:
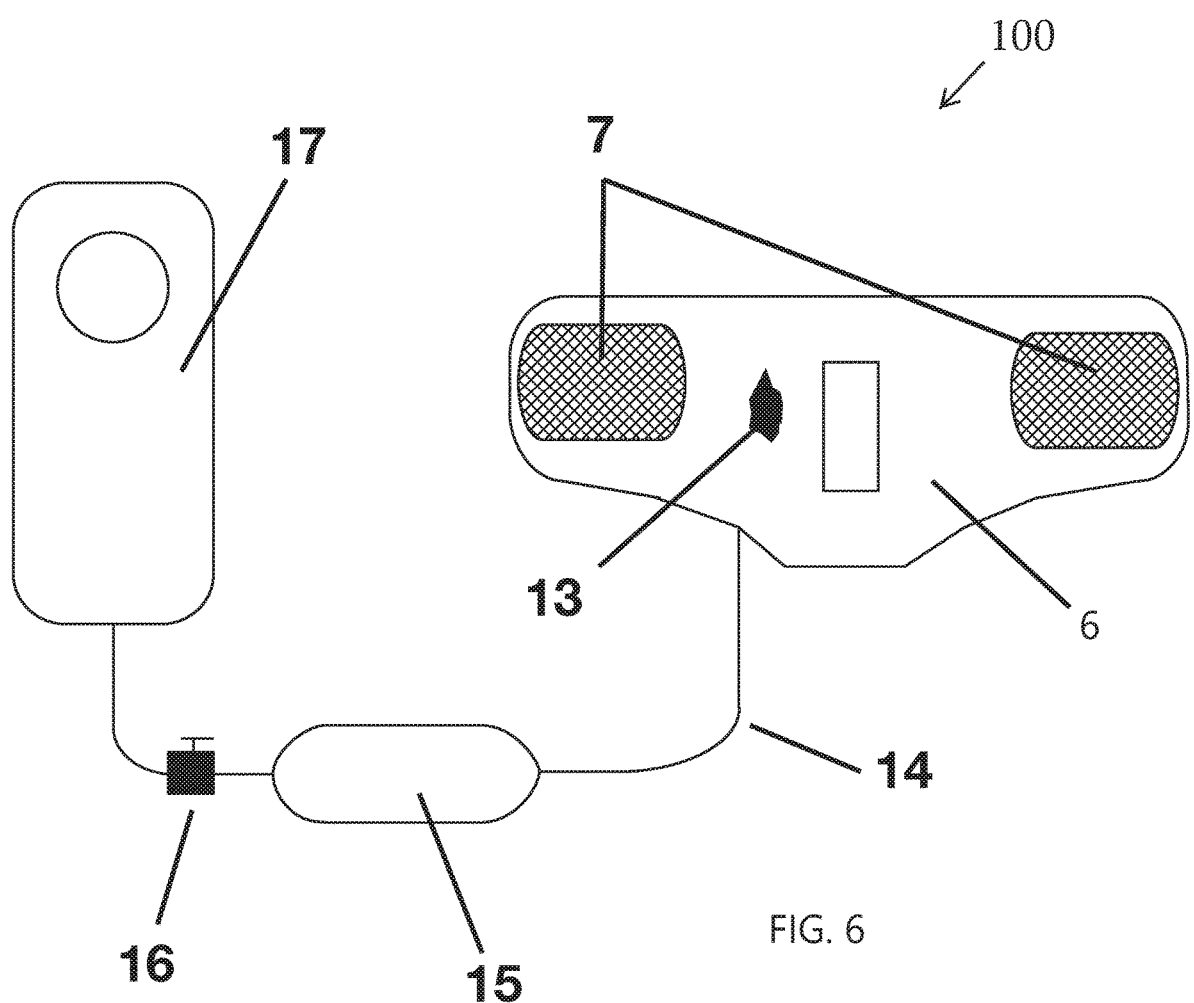
FIG. 6 is a schematic view of an exemplary embodiment of the overall system of the present invention.
Figure 7A:
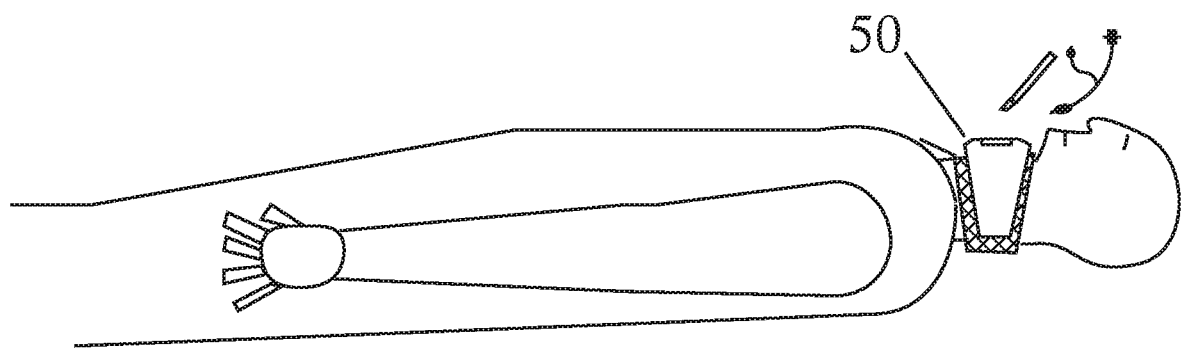
FIG. 7A-7C are schematic views of an exemplary embodiment of the present invention shown in use in airway-related surgical training.
Figure 7B:
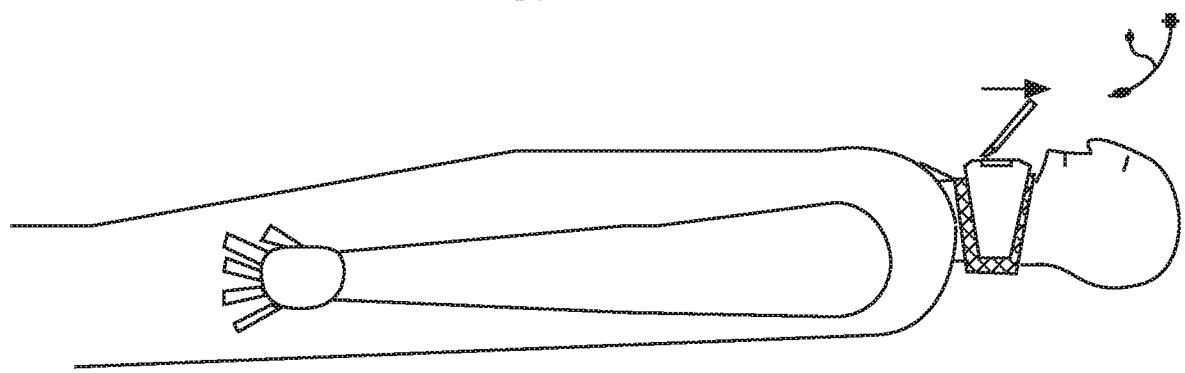
Figure 7C:
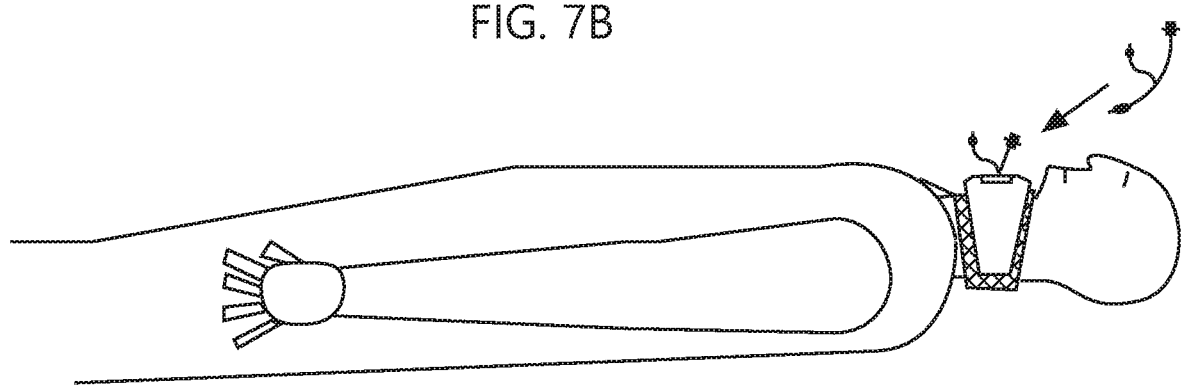

The base plate 1 may be anvil-shaped with a body portion 20, a waist portion 22, a heel portion 24, and a horn portion 26, as illustrated on FIGS. 1 and 2. The body portion 20 may provide a mesh window or boundary 30 on one or both surfaces thereof to provide visibility of the integrated steel mesh 2 or an indication where a central/body portion 10 is during use. The heel portion 24 may provide a first connector 4 and second connector 5 on opposing, front and rear surfaces, respectively.

The hook portion 25 and the heel portion 24 may be dimensioned and adapted to wrap around a human neck so that the first connector 4 can removable connect to the second connector 5 in a secured condition, securing the body portion 20 adjacent to a trachea area of the wearer. The first connector 4 is more elongated than the second connector 5 so that a proximal portion of the first connector 4 would be unengaged by the second connector 5 in the secured condition. A third connector 3 may be disposed between the body portion 20 and a distal end of the horn portion 26. As a result, in the secured condition, the proximal portion of the first connector 4 and the third connector 3 are viable to be attached to by the front panel 6. The removable connectors 3, 4 and 5 may be hook and loop fasteners or the like for adjusting the fit to different-sized necks.

The waist portion 22 may be a flap dimensioned and adapted to protect against irritation of the role player/wearer while an airway tube or adjunct tools are utilized/inserted during the airway-related training.

The front panel 6 may be a sleeve with an access window 40 that communicates between a front surface and opposing rear surface of the front panel 6. The access window 40 is centrally located. The front panel 6 provides rear connectors 7 along the both ends thereof. The rear connectors 7 are dimensioned and adapted to engage the proximal portion of the first connector 4 and the third connector 3 of the base plate 1 in the secured condition, removably attaching the front panel 6 to the base plate 1 in such a way that the access window 40 lays over the integrated steel mesh 2 defined by the cutout 30 or at least boundary defined by 30. In any event, the access window 40 is adjacent to and/or surrounds the trachea of the role player.

A sacrificial skin component 17 may be dimensioned and adapted to removably cover the access window 40. In other embodiments, the sacrificial skin component 17 may be sandwiched between the base plate 1 and the front panel 6 so as to be engaged by the front panel 6 so that a portion of the sacrificial skin component 17 is visible through the access window 40, creating a realistic simulation of airway-related/trachea skin while allowing for rapid replacement of the sacrificial skin component 17 after a trainee is done performing surgical access. The sacrificial skin component 17 may be designed to be cuttable by surgical tools to access other portions of the sleeve-like front panel 6, which represents other portions of the role player's neck. Thereby the airway-related medical training enables a trainee access to the "neck" of the role player without damaging reusable (non-sacrificial skin component 17) parts of the front panel 6. The front panel 6 may have a simulated wound 13 fluidly coupled to a conduit 14, a pump system 16 and a blood reservoir 15 for creating the appearance of an arterial bleeding from the simulated wound site 13.

The front panel 6 and/or the sacrificial skin component 17 may come in various colors and textures, as exhibited in the illustrations, specifically skin colors and textures of 8, 9 and 10, whereby the front panel 6 provides, for instance, textured skin to give the appearance of burns to the entire surface front surface.

The sacrificial skin component 17 may also be fluidly attached to the blood reservoir 15 for creating the appearance of bleeding from the trachea area. The blood pouch 15 may be placed behind the sacrificial skin component 17 and filled with simulated blood to give the appearance of bleeding from the surgical site when the users cuts through the sacrificial skin component 17.

The present invention allows the end user to create a realistic training aid that feels and responds to the surgical airway procedure including the mounting of a trachea model and the bleeding from the surgical site common to the surgical airway procedure. Additionally, the airway medical training device is low profile creating a realistic and natural outward appearance and conform to the role player wearing it. The integration of a flexible steel mesh system allows for safe training of the Open Surgical Airway Procedure (OSAP), see FIGS. 7A through 7C. This device is capable rapid resetting after use facilitating large groups of trainees. The carotid wound configuration allows for the user to simulate a carotid bleeding wound requiring wound packing and a subsequent surgical airway placement. The burn configuration presents the appearance of burned skin indicated the need for open surgical airway. Additional configurations may also include the addition of simulated swelling with the use of fluid-filled reservoirs 15 indicating the collection of blood under the skin (front panel) of the neck necessitating OSAP, and thus a good training tool.

A method of making the present invention may include the following. First, a manufacturer may make the present invention using two molds layered with a synthetic leather to create a skin-like appearance of the colored silicone that is poured into the mold. Each part may be molded separately and may have a high performance, four-way stretch nylon impregnated into the silicone prior to completion of the cure period. The base plate may have a layer of steel mesh that is placed into the silicone to be completely encapsulated into the model allowing for no visibility of the metal insert in the final product. After the silicone has cured the excess stretch nylon is trimmed from each model. Removable fasteners may be sewn onto the model at specific location outlined in the attached picture using colored thread on a standard sewing machine or adhering via adhesive substances. The removable colors may be matched to the a plurality skin tones that the device is made in including light, medium and dark skin. The sacrificial skin made in a leather covered flat mold measuring 20×15 inches and then is cut into twenty-five individual silicone squares. The blood reservoir may be made from a vacuum seal bag measuring 3×6 inches where 5-25 ml of red colored fluid is placed inside the bag and heated sealed using a vacuum sealer.

A method of using the present invention may include the following. The wearable airway medical training device 100 disclosed herein may be provided. A medical licensed medical trainer (end-user) would assemble the device and configure it for either a non-wounded neck or a wounded neck configuration depending on their training needs. The assembled device would then be attached to a role player who would make the actions and sounds of a person with an airway obstruction. The end-user would then direct a trainee to assess the patient and perform an open surgical airway procedure. The trainee can continue the medical scenario at the direction of end-user. After the training scenario is completed, the role player will remove the device and the end-user will reset the device for another scenario. This device allows for realistic and rapid open procedure surgical airway training. The profile of this devise allows the end-user to create complex scenarios while maintaining a realistic appearance. The unique safety features of this device in the form of flexible steel mesh allows for safe surgical airway training while maintaining safety of the role player.

It should be understood, of course, that the foregoing relates to exemplary embodiments of the invention and that modifications may be made without departing from the spirit and scope of the invention as set forth in the following claims.

What is claimed is:

1. A neck-related medical training system, comprising:
a layer of flexible steel mesh having a first thickness between and including 1/16th of an inch to 3/16th of an inch, said layer configured to conform to a shape of a portion of a neck of a wearer; and
a front panel having an access window, the front panel configured to removably attach to the layer of flexible steel mesh so that the access window is adjacent to a trachea of the wearer, wherein the front panel has a second thickness between and including 1/16th of an inch to 3/16th of an inch,
whereby the conformability of the layer of mesh in conjunction with the combined thickness of the layer of steel mesh and the front panel being thickness between and including 1/8th of an inch to 3/8th of an inch, realistically simulates a profile of the neck of the wearer.

2. The neck-related medical training system of claim 1, further comprising:
a simulated skin component removably sandwiched between the layer of flexible steel mesh and the front panel so that a portion of the simulated skin component is visible through the access window.

3. The neck-related medical training system of claim 1, further comprising:
a base plate integrating the layer of flexible steel mesh into silicone, and wherein the silicone is impregnated with four-way stretch nylon.

4. The neck-related medical training system of claim 3, further comprising:
the base plate having a body portion and a flap portion depending from the body portion in such a way that the flap portion is adjacent to a lower neck portion of the wearer.

5. The neck-related medical training system of claim 2, further comprising:
a blood reservoir fluidly coupled to the simulated skin component.

6. The neck-related medical training system of claim 5, wherein the blood reservoir is fluidly coupled to a simulated wound site along the front panel.

7. The neck-related medical training system of claim 1, further comprising a burn texture along the front panel.

8. A neck-related medical training system, comprising:
a base plate having a layer of flexible steel mesh having a thickness between and including 1/16th of an inch to 3/16th of an inch configured to conform to a shape of a neck of a wearer to form a realistic simulation thereof;
the base plate having a flap portion configured to be adjacent a lower portion of the neck;
a front panel having an access window, the front panel configured to removably attach to the cut-resistant layer so that the access window is adjacent to a simulated trachea attached to the base plate;
a simulated skin removably sandwiched between the front panel and the base plate, and wherein a portion of the simulated skin is visible within the access window; and
a blood reservoir disposed under the simulated skin.

9. The neck-related medical training system of claim 8, wherein the blood reservoir is fluidly coupled to a simulated wound site along the front panel.

10. The neck-related medical training system of claim 8, further comprising a burn texture along the front panel.

11. A neck-related medical training system, comprising:
a layer of flexible steel mesh having a first thickness configured to conform to a shape of a portion of a neck of a wearer; and
a front panel having an access window, the front panel configured to removably attach to the layer of flexible steel mesh so that the access window is adjacent to a trachea of the wearer,
whereby the conformability of the layer of mesh in conjunction with the combined thickness of the layer of steel mesh and the front panel, realistically simulates a profile of the neck of the wearer.

12. The neck-related medical training system of claim 11, further comprising:
a simulated skin component removably sandwiched between the layer of flexible steel mesh and the front panel so that a portion of the simulated skin component is visible through the access window.

\* \* \* \* \*